Jan. 3, 1956  G. J. KELLER  2,729,564
METHOD OF RECOVERING VOLATILE FLAVORING OILS
Filed March 2, 1951
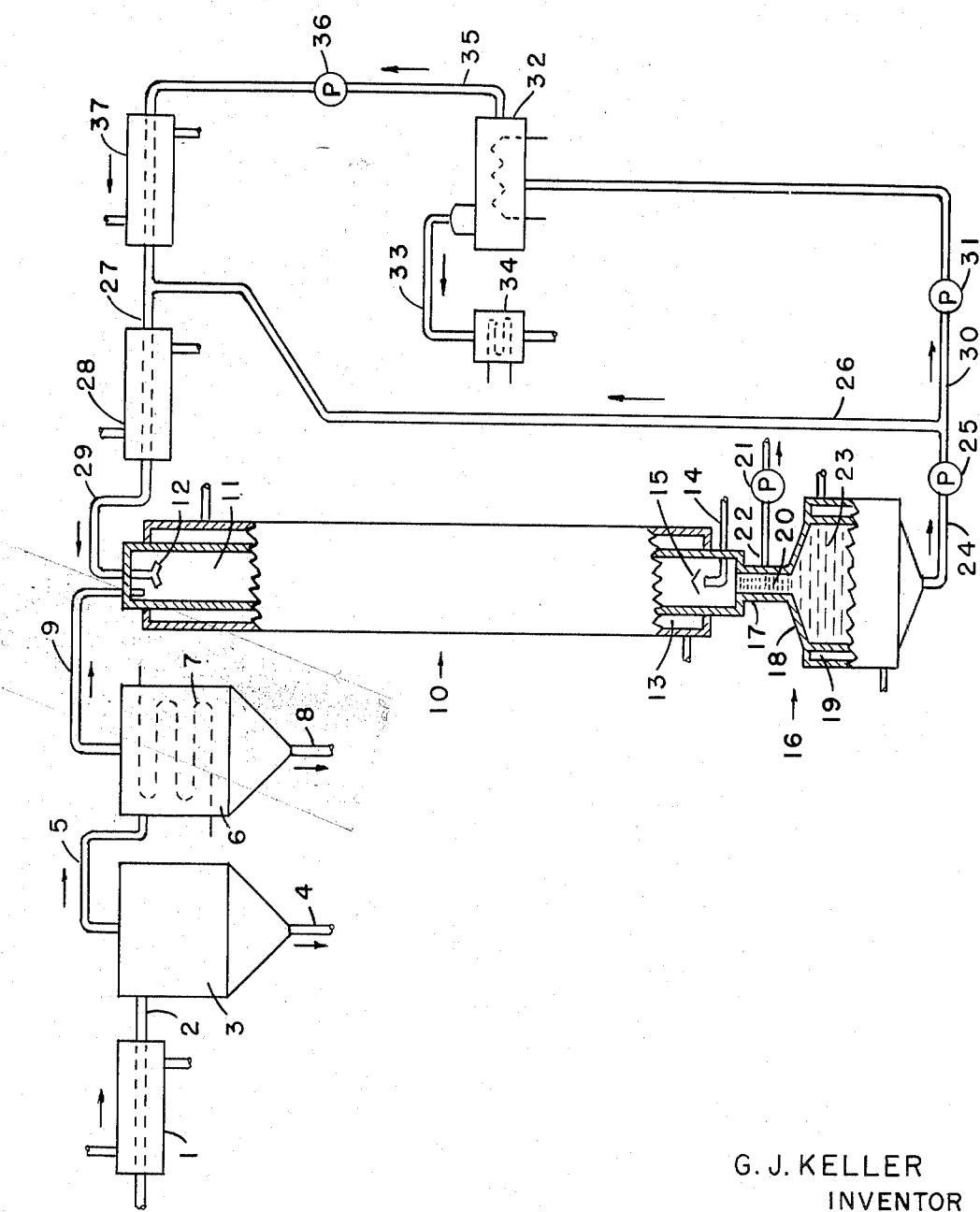
G. J. KELLER
INVENTOR
L. M. Mantell
William Bier
ATTORNEY

United States Patent Office

2,729,564
Patented Jan. 3, 1956

2,729,564

METHOD OF RECOVERING VOLATILE FLAVORING OILS

George J. Keller, Arcadia, Calif., assignor to the United States of America as represented by the Secretary of Agriculture Application March 2, 1951, Serial No. 213,639

8 Claims. (Cl. 99—140)

(Granted under Title 35, U. S. Code (1952), sec. 266)

The invention herein described may be manufactured and used by or for the Government of the United States of America for governmental purposes throughout the world without the payment to me of any royalty thereon.

This invention relates to the recovery of volatile flavoring oils from vapors, for example, the vapors which are evolved in the evaporation or deaeration of citrus juices, purees, or other fruit products which contain volatile flavoring oils. By applying the principles of this invention, the volatile flavoring oils which are normally lost in the processing treatment are recovered in concentrated form suitable for reincorporation with the original fruit product to restore its characteristic flavor. The recovered volatile flavoring oils may also be used to enhance the flavor of other food products as, for example, jams, jellies, marmalades, preserves, syrups, sherbets, beverages, fruit juices or purees, concentrated fruit juices or purees, and so forth.

In the manufacture of fruit products it is common practice to subject the fruit to at least one processing step involving the application of heat, vacuum, or both to the fruit which results in a vaporization of moisture from the fruit together with substantial quantities of volatile flavoring oils. Operations which cause this result may be for the ultimate purpose of concentrating, deaerating, blanching, dehydrating, cooking, pasteurizing, sterilizing, or various combinations of these. In such operations, the volatile flavoring oils which are vaporized are not recovered because of several reasons which will be explained hereinafter and as a consequence the product is deprived of its normal content of volatile flavoring oils and is necessarily inferior in flavor to the natural product. Examples of such processing procedures and the problems associated therewith are set forth below:

Concentrated orange juice is prepared by heating the fresh juice in an evaporator, preferably at sub-atmospheric pressure to reduce the boiling point of the juice and hence reduce the damage by heat to the final product. Many types of evaporators have been designed to heat the juice with low temperature heating media and, at the same time, obtain a high rate of evaporation. The water vapor containing the vaporized volatile oils emitted by the juice is removed from the evaporator and passed through a surface condenser using a coolant to maintain the temperature of the condenser surface low enough to condense practically all the water vapor as liquid water. In multiple-effect designs, the greater part of the water vapor is removed by condensation in each successive effect, each effect acting as a surface condenser. In any case, the residual vapors and non-condensable gases are removed by suitable pumps. In operations like this the evaporation of water from the juice also results in the steam distillation and subsequent loss of the volatile flavoring oils. As an example of this loss of flavoring oils, in preparing conventional frozen citrus juice concentrate by low temperature evaporation, the fresh juice must be evaporated to a considerably higher solids content than ultimately desired and then cut back to a lower solids content by the addition of fresh juice for the purpose of restoring the characteristic flavor due to the volatile flavoring oils. The fact that a large part of these oils is lost in the conventional methods of evaporation can be explained by the volatility of these oils and their insolubility and immiscibility in water. Thus when the gases evolved from the evaporation are passed through the surface condenser, a portion of the water vapor is not condensed but remains as water vapor and effects a steam distillation of the volatile oils whereby they remain in the vapor phase and pass through the surface condenser and are discarded with the residual vapors and non-condensible gases. Even surface condensers that remove water by freezing out ice have vapor pressures sufficient to steam distill out the flavoring oils. Further, these volatile flavoring oils are present in such small quantities in the original juice that they represent infinitesimal amounts in the evolved water vapor and therefore must be concentrated to a considerable degree before being useful as a flavoring addition product.

In the process of deaeration of orange juice, the juice is subjected to a high vacuum and made to ebullate sufficiently to cause a slight evaporation of water with the subsequent removal of occluded and dissolved gases. This process also results in evaporation of volatile flavoring oils from the juice. The vapors evolved from this treatment are usually passed through a surface condenser which as in the case aforesaid is incapable of recovering the volatile flavoring oils. That loss of flavoring oils occurs is shown by the fact that citrus juices deaerated by vacuum treatment have been observed to have less characteristic flavor than undeaerated juices.

I have now devised the means whereby these disadvantages of the prior art may be eliminated and it is an object of this invention to provide a process whereby volatile flavoring oils can be recovered in a concentrated form which will enable them to be reincorporated in the original products restoring their characteristic flavors with a minimum dilution of the final product.

Another object of this invention is to provide a process whereby the volatile flavoring oils can be recovered by separating them from the water-soluble and water-miscible materials normally accompanying these oils.

These and other objects and advantages of this invention will become more apparent from the following description and examples taken in conjunction with the accompanying drawing which illustrates apparatus which may be used in carrying out my process.

In accordance with this invention, it has been found that volatile flavoring oils can be separated and concentrated in a convenient and simple manner. The oils recovered by the process disclosed herein are collected in such a concentrated form that no further distillation or rectification is necessary.

The unusual results outlined above are accomplished by passing the gases evolved from the conventional surface condenser, that is, the residual water vapor with its accompanying volatile flavoring oil vapors, in contact with a refrigerated hygroscopic aqueous solution of an inorganic electrolyte immiscible with the flavoring oil. In this way the water is preferentially absorbed and its vapor pressure lowered to such a degree that the oil can then condense out on the cold, absorbent surface and be collected in a suitable manner. The hygroscopic solution serves four purposes: First, the water is absorbed and removed; second, the vapor pressure of the water is lowered to a negligible value; third, the temperature of the absorbent (the hygroscopic solution) can be lowered considerably by economical refrigeration causing the oils to condense; fourth, due to the immiscibility of volatile essential oils in aqueous solutions, the oils form a separate liquid phase which can easily be removed.

Many different electrolytes may be used for the hygroscopic aqueous solution. Preferably, the selected electrolyte should be insoluble in the flavoring oils encountered, chemically unreactive with the flavoring oils, chemically stable themselves, reasonably non-corrosive, soluble in water at concentrations sufficient to be strong vapor pressure depressants at the temperatures encountered, non-volatile and non-toxic. For practical purposes, I prefer to use calcium chloride but some other electrolytes which may be used are, for example, phosphoric acid, zinc bromide, lithium chloride, lithium bromide, calcium bromide, aluminum chloride, calcium nitrate, calcium iodide, potassium nitrite, potassium chloride, potassium iodide, potassium carbonate, potassium hydroxide, lithium nitrate, lithium iodide, magnesium chloride, magnesium bromide, magnesium iodide, magnesium nitrate, sodium nitrate, sodium hydroxide, sodium nitrite, sodium bicarbonate, sodium iodide, ammonium chloride, ammonium bromide, ammonium iodide, and so forth. Mixtures of different salts may be used if desired. The concentration of the electrolyte should be sufficient to render the solution hygroscopic and of low freezing point. In general, concentrations from about 30% to about 50% give good results.

In a preferred embodiment of the invention, the absorber is a wetted-wall, falling-film type, internally cooled, with the hygroscopic solution continuously recirculated. A proper amount of the diluted absorbent is withdrawn continuously, concentrated, and returned to the absorbent to maintain the concentration at the desired level. The absorbent is collected at the bottom of the absorber in a large reservoir with the surface level being maintained constant and having a restricted surface area. This causes the exceedingly small volume of oil to occupy a larger vertical distance which thus enables the oil to be decanted off by suitable means. Entrainment of the condensed oil globules in the falling film of absorbent necessitates a large enough reservoir to lower the velocity of the flowing absorbent far enough to enable the less dense oils to rise to the surface of the reservoir and be collected. The temperature of the falling film of absorbent is as low as practicable depending upon the electrolyte concentration of the solution and the absorbent electrolyte used. The temperature is limited because of the danger of freezing and solid separation at too low a temperature. Generally, a temperature range from about $-10°$ F. to about $+10°$ F. is satisfactory.

The falling film type of absorber is the preferred type over a spray type, for example, because less entrainment of the condensed oil will result. Further, a falling film type of absorber offers a minimum of pressure drop to the system. Another feature of importance with regard to this invention is that a consistently lower temperature can be maintained resulting in increased oil condensation. This does not mean to imply that other types of absorbers will not be satisfactory since any means of obtaining intimate contact between the absorbent solution and the vapors will effectively perform the same operation.

The recovered oils when decanted from the surface of the absorber reservoir can be reincorporated into the juice from which it was volatilized by any number of suitable means. It may be blended mechanically in a suitable blender with or without the use of additional materials. An important feature of this invention in this connection enables the recovered oils to be reincorporated into the original source without ever becoming exposed to the atmosphere or other sources of atmospheric oxygen thereby lessening the onset of oxidative changes within the oils and the resulting off-flavors and off-odors.

Another advantage of my process is that, depending on the ultimate intended use, the recovered volatile flavoring oil may be washed with a suitable solvent, such as plain water, or may be further distilled or rectified to remove or separate other desired or undesired portions or fractions.

The drawing accompanying this description illustrates apparatus which may be used in carrying out the process of this invention. The apparatus and its functions are explained as follows:

The juice to be concentrated is pumped into heat exchanger 1, the heated juice then flowing through pipe 2 into separator 3 wherein the vaporous and liquid components are separated. The concentrated juice is withdrawn through pipe 4 whereas the vapors flow through pipe 5 into surface condenser 6 where they are subjected to contact with refrigerated coils 7. The condensed water is withdrawn through pipe 8 whereas the uncondensed vapors flow through pipe 9 into absorber 10 where they enter chamber 11. The refrigerated hygroscopic liquid is sprayed into chamber 11 by nozzle 12 which directs the liquid so that it flows down the walls of chamber 11. A jacket 13 is provided about chamber 11, this jacket being supplied with a refrigerating medium whereby to keep chamber 11 at a low temperature, i. e., from about $-10°$ F. to about $+10°$ F. In chamber 11, the vapors contact the hygroscopic solution whereby the water vapors are absorbed and the vapors of the volatile flavoring oils are condensed. The non-condensed vapors are removed from the chamber by pipe 14 which is connected with a suitable source of vacuum (not illustrated) to maintain the system under the requisite subatmospheric pressure. Baffle 15 is provided to prevent the liquid from entering pipe 14. The hygroscopic solution containing absorbed water and condensed flavoring oil flows into receiver 16 wherein a phase separation or stratification occurs, the volatile flavoring oil forming one phase which floats on top of the other phase consisting of the hygroscopic solution plus condensed water vapor. The receiver 16 is divided into 2 sections—neck 17 and tank 18. The latter is surrounded with jacket 19, this being supplied with a refrigerating medium. The volumes of neck 17 and tank 18 are so proportioned that the diluted hygroscopic solution collects in tank 18 whereas the oil collects in neck 17. The resulting stratum of oil 20 is isolated from the system by pump 21 via pipe 22. The diluted hygroscopic solution 23 is drawn out of tank 18 through pipe 24 by pump 25 and through pipes 26, 27 to cooler 28. From cooler 28, the refrigerated solution, at a temperature from about $-10°$ F. to about $+10°$ F., flows through pipe 29 to nozzle 12 where it is sprayed into chamber 11.

A required amount of the recirculating absorbent solution is withdrawn continuously through pipe 30 by pump 31 and concentrated in concentrator 32 by evaporating an amount of water equal to that absorbed in absorber 10. The evaporated water vapor is passed through conduit 33 to condenser 34 where it is removed from the system. The concentrated absorbent solution is withdrawn continuously from concentrator 32 through pipe 35 by pump 36 and fed back into the recirculating hygroscopic absorbent through cooler 37. This maintains the falling film of liquid in chamber 11 at the desired concentration.

The following examples demonstrate the invention in more detail. These examples are furnished only by way of illustration and not limitation. The falling-film absorber referred to in the examples was constructed similar to that illustrated in the drawing and explained above.

*Example 1*

Three gallons of orange juice with an oil content of 0.28% (v./v.) was evaporated at a temperature of approximately 60° F. in a pilot model falling-film evaporator. The water vapor and volatilized oil were passed through a surface condenser maintained at 38° F. by chilled water. The vacuum source was connected to the surface condenser through a falling-film jacketed absorber. The recirculating absorbent was a solution of approximately 40% calcium chloride in water maintained at a temperature of approximately 5° F. The vapors and gases were passed concurrent to the falling film of absorbent. Between the absorber and the vacuum source was a Dry-Ice-alcohol refrigerated trap at a temperature of approximately —95° F. After 85% of the original volume of orange juice had been evaporated, a layer of 2.8 ml. of oil had formed upon the surface of the absorber reservoir. In the Dry-Ice-alcohol refrigerated trap, 8.8 ml. of oil was recovered.

*Example II*

Twelve gallons of orange juice with an oil content of 0.01% (v./v.) was evaporated at a temperature of approximately 58° F. in a pilot model falling-film evaporator. The water vapor and volatilized oil were passed through a surface condenser maintained at 37° F. by chilled water. The vacuum source was connected to the surface condenser through a falling-film jacketed absorber. The recirculating absorbent was a solution of approximately 50% calcium bromide in water maintained at a temperature of approximately 5° F. The vapors and gases were passed concurrently to the falling film of absorbent. Between the absorber and the vcuum source were three Dry-Ice-alcohol refrigerated traps at a temperature of approximately —95° F. After 87% of the volume of orange juice had been evaporated, a layer of 0.9 ml. of oil had formed upon the surface of the absorber reservoir. In the Dry-Ice-alcohol refrigerated traps 0.7 ml. of oil was recovered.

Having thus described my invention, I claim:

1. A method for recovering a volatile flavoring oil from a gaseous material containing said oil and water vapor which comprises contacting said gaseous material with a refrigerated hygroscopic aqueous solution of an inorganic electrolyte immiscible with the flavoring oil whereby to absorb the water vapor and to condense said oil, allowing the resulting mixture to stand whereby to form a flavoring oil phase and an aqueous phase containing the absorbed water vapor, and separating the flavoring oil phase.

2. A method for recovering a volatile flavoring oil from a gaseous material, said material being derived from a fruit and containing said oil and water vapor which comprises contacting said gaseous material with a refrigerated hygroscopic liquid solution of an inorganic electrolyte immiscible with the flavoring oil whereby to absorb the water vapor and to condense said flavoring oil, allowing the resulting mixture to stand whereby to form a flavoring oil phase and an aqueous phase containing the absorbed water vapor, and separating the flavoring oil phase.

3. The method in accordance with claim 2 wherein the fruit is a citrus fruit.

4. In a method of processing citrus products wherein the citrus product is subjected to evaporative conditions to cause vaporization of water and volatile flavoring oil from the product and the evolved vapors are contacted with a refrigerated solid surface to condense water vapor, the improvement which comprises collecting the vapors which remain uncondensed and contacting them with a refrigerated hygroscopic aqueous solution of an inorganic electrolyte immiscible with the flavoring oil whereby to absorb water vapor and to condense said flavoring oil, allowing the resulting mixture to stand whereby to form a flavoring oil phase and an aqueous phase containing the absorbed water vapor, and separating the flavoring oil phase.

5. The method in accordance with claim 4 wherein the aqueous phase is continuously collected, concentrated and re-circulated to contact further amounts of the uncondensed vapors.

6. The method in accordance with claim 4 wherein the aqueous solution is a solution of calcium chloride in a concentration from about 30% to about 50%.

7. The method in accordance with claim 4 wherein the aqueous solution is a solution of calcium bromide in a concentration from about 30% to about 50%.

8. The method in accordance with claim 4 wherein the citrus product is orange juice.

References Cited in the file of this patent

UNITED STATES PATENTS

| | | |
|---|---|---|
| 2,450,774 | Zahn | Oct. 5, 1948 |
| 2,479,745 | Homiller et al. | Aug. 23, 1949 |
| 2,504,735 | Schwarz et al. | Apr. 18, 1950 |
| 2,513,813 | Milleville | July 4, 1950 |